April 15, 1958 M. S. PELLEGRINI 2,830,490
METHOD AND APPARATUS FOR MEASURING THE
SURFACE SMOOTHNESS OF GLOSSY OBJECTS
Filed Sept. 16, 1955
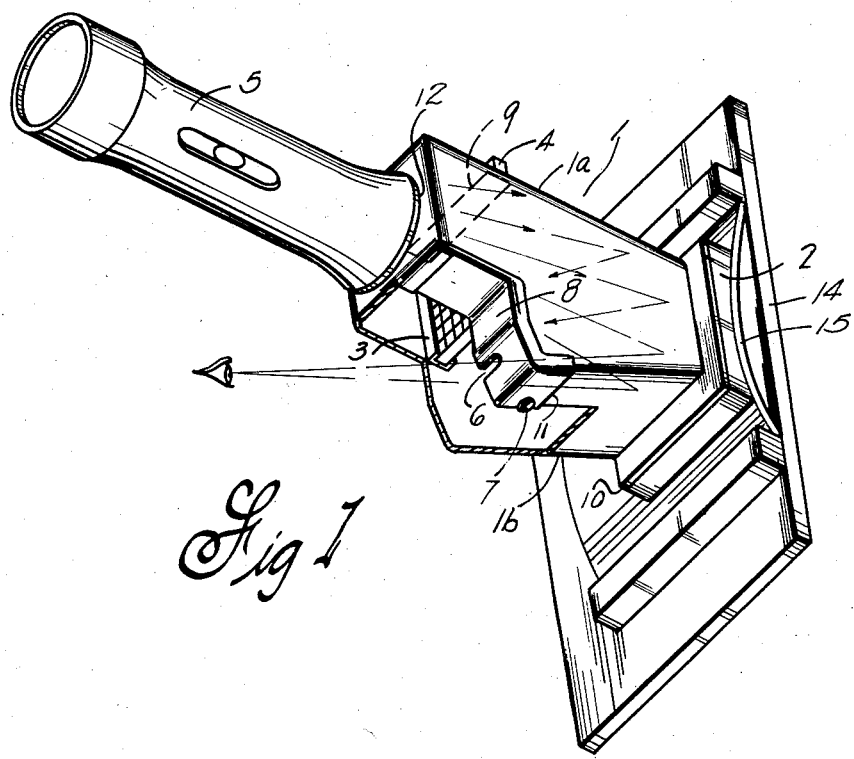
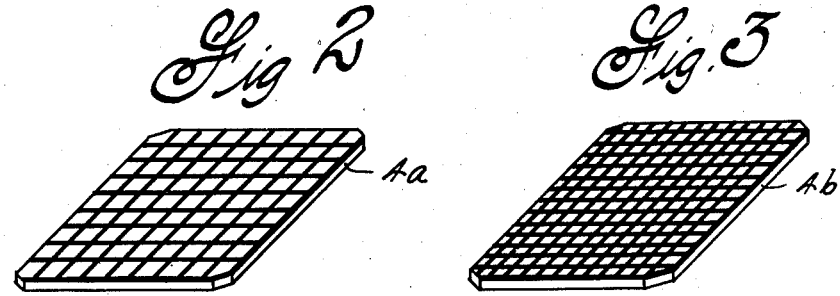
INVENTOR.
Mary S. Pellegrini United States Patent Office 2,830,490
Patented Apr. 15, 1958

2,830,490

METHOD AND APPARATUS FOR MEASURING THE SURFACE SMOOTHNESS OF GLOSSY OBJECTS

Mary S. Pellegrini, Philadelphia, Pa.

Application September 16, 1955, Serial No. 534,899

1 Claim. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to measuring and testing devices used in determining the gloss and surface smoothness of glossy surfaced objects.

Prior methods and apparatuses for testing and measuring gloss and surface smoothness, all suffer from at least one defect. Thus, the specular gloss measurement system must be used on flat surfaces; in another method of testing, comparisons with standards which are changeable in value in order to obtain a reading are necessary; and in still another testing apparatus, the equipment is not adapted to be used outdoors.

The present device does not have any of the above inherent defects present and the design of the unit is such that the disadvantages are eliminated at no expense to accuracy.

It therefore, is an object of this invention to provide a gloss and surface smoothness measuring device which is inexpensive to manufacture and assemble.

It is a further object of this invention to provide a device of the aforesaid type which is portable in that it can be used indoors and outdoors.

It is an additional object of this invention to provide a device of the aforesaid type which is not restricted to the measurement of flat surfaces but can also be used on surfaces other than flat, as for example, on curved surfaces.

It is still an additional object of this invention to provide a device which can be used to measure the gloss or surface smoothness of surfaces treated in any manner without modifying the basic test equipment to compensate for the variety of surface treatment.

These and other objects and advantages of the invention will be apparent from the following specification when taken with the accompanying drawings in which:

Fig. 1 is a partial cross-sectional perspective view of the invention, and

Figs. 2 and 3 depict a pair of grids that may be used in the testing unit.

As seen in Fig. 1, the view box 1 has an upper horizontal surface, 1a, and a lower surface, 1b, at an angle with the horizontal surface. The two sides are joined together by parallel walls to form an enclosed body. The rear end of the view box is turned into a flange 10 to which is attached a foam rubber piece 2.

The upper front section of the view box is extended to form a rectangular extension. The forward portion of the extension is cut away to provide accommodation for the flash light 5 equipped with a light diffusing element 12. Light 5 is an ordinary 2-cell non-focusing flash light and is fixedly mounted to the box.

An opening is provided at the front end of the viewer by having the lower side 1b of shorter length than the upper side 1a and by providing a cut-away, 11, in the rectangular extension. A cover, 8, seals the opening provided thereby, which cover is fastened to the lower end of the view box by means of a screw 7 tightened into a threaded hole in the lower section. A slot 6 is provided in the cover for viewing the image in the box interior when the device is in operation.

Mounted on the inner side walls of the rectangular extension are the guide means 3. A lateral slit, 9, is provided in the upper side of the box; the slit and guides thus allowing a grid plate, 4, to be passed through the slit and retained by the guides.

A series of grids or screens are provided (Figs. 2 and 3 for example) which screens conform to a series of U. S. mesh screens by reproducing the standard mesh screens on either draftsman's linen paper or on Trans-Lite process film. The grids or screens may be mounted in any desired manner for better fit in the guide system.

*Operation*

The viewer box is placed against the surface to be tested. The surface may be either flat or curved or may possess some other shape. In Fig. 1, the viewer is placed against a curved panel 15 held in a jig 14. One of the test grids or screens is inserted in the slot and guides and the flashlight is turned on; the light emanating from the light source is diffused slightly due to the diffuser at the head of the flashlight. The image of the interchangeable screens is examined through the viewing slit, 6, by the observer until the least discernible screen is found. The number of this screen which corresponds to a standard U. S. screen mesh number is the distinctness of image rating for that surface.

In conducting the distinctness of image test procedure, it was found that the most reliable results were obtained when the observer was able to compare the image produced by a series of grid sizes (Figs. 2 and 3) rather than using a single standard. By using a series of grid sizes, the observer can choose the grid size which falls between the grid size which is clearly discernible and the one which produces no image at all. For example, if on the same panel, the first sieve gives a clear image; a subsequent sieve gives a barely discernible image; and a still subsequent sieve produces no image whatsoever, the distinctness of image for the panel tested is the second of the three sieves.

Obviously, any number of testing screens may be used; the larger the number, the more accurate the results; the fewer screens, the less accurate the results.

With the above operating procedure, it is noted that the amount of light exterior to the apparatus has no effect on the accuracy of the readings as the only light that comes into play in the viewer is the light from the flashlight.

At the same time, the type of panel tested may be of various configurations. As shown, a curved panel is tested; thus showing that the test apparatus is not restricted to mere flat panel sections.

Obviously many modifications and variations of the present invention are possible in the light of the above teachings. It is therefore to be understood that within the scope of the appended claim the invention may be practiced otherwise than as specifically described.

What is claimed is:

A device for measuring the gloss of a plane or curved surface by positioning said device on said surface and alternately reflecting standard mesh screens by said surface in said device until a visually distinct image is obtained which determines the gloss rating of said test surface, comprising a substantially light-proof box having a top, side and parallel walls, and an open bottom, a cushioning means secured to the edge defining said open bottom, adapted for contour and light sealing engagement of said box with said test surface whereby a light-proof chamber is defined in said box when said open bottom is positioned in sealing engagement with said test surface, said top and side walls being arranged to form an extension and a lower level top portion on said box, said extension being provided with an aperture therein, a flashlight having a diffuser for projecting light into said chamber mounted in said aperture, mesh screen supporting means on the interior surface of said parallel walls for supporting a mesh screen in said chamber between said flashlight and said open bottom, and a mesh screen mounted on said support means having a mesh capable of being reflected as a visually distinct image by said test surface, said low level top portion being provided with a slot for visual observation of said image and said gloss being determined by the rating of said screen producing said distinct image.

References Cited in the file of this patent

UNITED STATES PATENTS

| | | |
|---|---|---|
| 1,503,543 | Lytle | Aug. 5, 1924 |
| 1,756,785 | Gallasch | Apr. 29, 1930 |

FOREIGN PATENTS

| | | |
|---|---|---|
| 600,943 | Germany | Aug. 4, 1934 |

OTHER REFERENCES

Gardner, H. A.: "A New Gloss Comparator," pages 268–280 comprising circular No. 493, issued October 1935 by National Paint, Varnish and Lacquer Association, Inc., Washington, D. C.